(12) United States Patent
Tackett et al.

(10) Patent No.: US 8,739,149 B2
(45) Date of Patent: May 27, 2014

(54) SOFTWARE UPDATES VIA DIGITAL AUDIO MEDIA

(75) Inventors: Jeffrey Tackett, Allen Park, MI (US); Shaun Ryan, Taylor, MI (US)

(73) Assignees: Harman International Industries, Incorporated, Stamford, CT (US); Harman Becker Automotive Systems GmbH, Stamford, CT (US)

( * ) Notice: Subject to any disclaimer, the term of this patent is extended or adjusted under 35 U.S.C. 154(b) by 1133 days.

(21) Appl. No.: 12/579,393

(22) Filed: Oct. 14, 2009

(65) Prior Publication Data

US 2011/0088024 A1    Apr. 14, 2011

(51) Int. Cl.
*G06F 9/44* (2006.01)
*G06F 9/445* (2006.01)

(52) U.S. Cl.
CPC .................................. *G06F 8/65* (2013.01)
USPC .............................. 717/168; 704/200

(58) Field of Classification Search
None
See application file for complete search history.

(56) References Cited

U.S. PATENT DOCUMENTS

| 6,525,775 | B1 | 2/2003 | Kahn et al. | |
| 7,366,589 | B2 | 4/2008 | Habermas | |
| 7,409,685 | B2 | 8/2008 | Chen et al. | |
| 7,424,731 | B1 | 9/2008 | Nathan et al. | |
| 7,577,751 | B2 * | 8/2009 | Vinson et al. | 709/231 |
| 2007/0009108 | A1 | 1/2007 | Furge | |
| 2008/0250126 | A1 * | 10/2008 | Stohr et al. | 709/221 |

FOREIGN PATENT DOCUMENTS

WO   WO 2005/043532 A1   5/2005

* cited by examiner

*Primary Examiner* — Elias Mamo
(74) *Attorney, Agent, or Firm* — Brooks Kushman P.C.

(57) ABSTRACT

Systems and methods for processing encoded digital data for programming a device to be re-programmed in an audio playback system. The system includes an audio media source containing digital data having audio data or encoded data in an audio data format. An audio media reader reads the digital data from the audio media source. A stream detector receives the digital data from the audio media reader and detects whether the received digital data includes encoded data formatted as audio data or audio data. An audio receiver device receives the audio data and processes the audio data for playback. A device to be re-programmed uses the encoded data formatted as audio data.

48 Claims, 8 Drawing Sheets

SOFTWARE UPDATES VIA DIGITAL AUDIO MEDIA

BACKGROUND OF THE INVENTION

1. Field of the Invention

This invention relates generally to computer-controlled systems having audio playback functions, and more particularly to systems and methods for updating software.

2. Related Art

Many systems that have audio-playback capability include functions implemented by computer control. Examples include audio systems in automobiles, which may be part of a more comprehensive system that includes navigation functions, passenger comfort control functions, and other passenger and driver services. Audio systems may include computer controlled functions. Audio systems may also be connected to a bus that provides signal connectivity with one or more other systems that may perform functions under computer control.

Systems that are computer-controlled include software programmed to perform their various functions. The software provides a mechanism for adding/subtracting features, fixing bugs, or otherwise improving the function of the computer-controlled system. Systems have their software updated or upgraded using a variety of techniques. In most systems, an optical disk drive configured to retrieve data from optical disks are connected to the system and may be used to install new or updated software.

Updating or installing new software in embedded systems is typically more difficult. Typically, access is needed to the memory chips that contain the software code. If the software is "burned" into PROMs, the PROMs may simply be exchanged for PROMs containing the updated software. The software may also be downloaded into the chips without having to remove them from their PC board. For example, the software may be programmed into flash memory, or some other suitable programmable memory device. The flash memory may be re-programmed without removing the memory from their circuit board by connecting a "burner" to the system bus and controlling the bus signals to access certain memory locations and to write into the locations. The "burner" may be a circuit board, or some other device having adapted to connect to the system's bus, and having connections to an instrument that controls the bus signals and writes to the memory locations. The "burner" writes the information that makes up a new version of software, a software update, a patch or some other element of changes to the software directly into the system memory.

One problem with updating software in embedded systems is that the devices that store the software are typically difficult to access. The devices are usually mounted on circuit boards contained in enclosures that hold the system hardware. Access to the bus may be similarly restricted. For example, an audio system in a vehicle may be installed in the vehicle's dashboard thereby burying the bus with other equipment that prevents access to the audio system bus.

There is a need for systems and methods for updating or making software revisions in embedded audio systems without having to physically connect to the system hardware.

SUMMARY

In view of the above, systems are provided for processing encoded digital data for programming a device to be re-programmed in an audio playback system. An example of a system includes an audio media source containing digital data having audio data or encoded data in an audio data format. An audio media reader reads the digital data from the audio media source. A stream detector receives the digital data from the audio media reader and detects whether the received digital data includes encoded data formatted as audio data or audio data. An audio receiver device receives the audio data and processes the audio data for playback. A device to be re-programmed uses the encoded data formatted as audio data.

In another aspect, methods are provided for processing encoded digital data for programming a device to be re-programmed in an audio playback system. In an example method, a digital data stream is read from an audio media source. It is determined if the digital data includes encoded data formatted as audio data. If the digital data does not include encoded data formatted as audio data, the digital data is processed as audio data. If encoded data formatted as audio data is included, the digital data is sent to a device to be re-programmed.

Other systems, methods and features of the invention will be or will become apparent to one with skill in the art upon examination of the following figures and detailed description. It is intended that all such additional systems, methods, and features be included within this description, be within the scope of the invention, and be protected by the accompanying claims.

BRIEF DESCRIPTION OF THE DRAWINGS

The examples of the invention described below can be better understood with reference to the following figures. The components in the figures are not necessarily to scale, emphasis instead being placed upon illustrating the principles of the invention. In the figures, like reference numerals designate corresponding parts throughout the different views.

DETAILED DESCRIPTION

In the following description of example implementations, reference is made to the accompanying drawings that form a part of the description, and which show, by way of illustration, specific example implementations in which the invention may be practiced. Other implementations may be utilized and structural changes may be made without departing from the scope of the invention.

Figure 1:
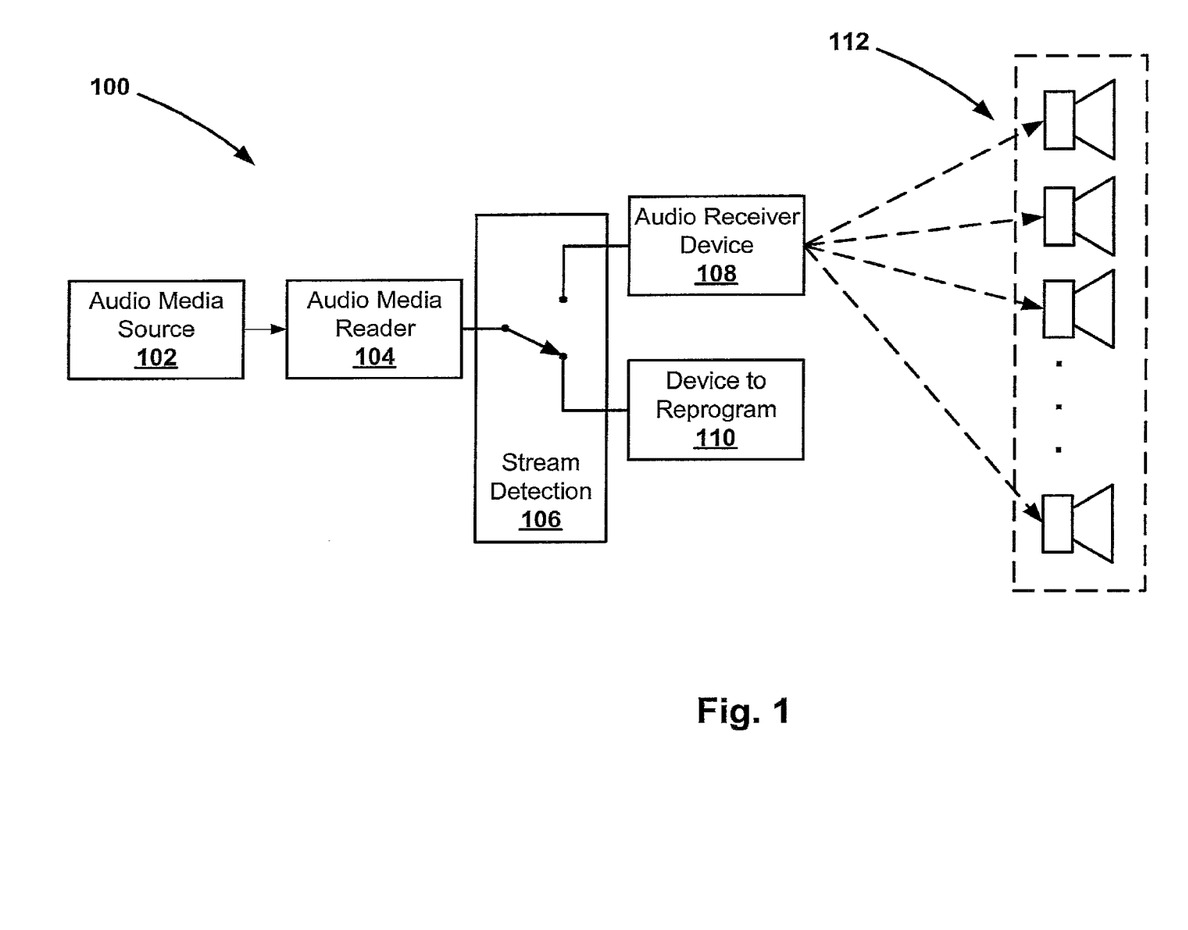
FIG. 1 is a block diagram of an example system for changing a programmed device in a computer-controlled system having audio playback capabilities.

FIG. 1 is a block diagram of an example system 100 for changing a programmed device in a computer-controlled system having audio playback capabilities. The system 100 includes an audio media source 102, an audio media reader 104, a stream detector 106, an audio receiver device 108, a device to be reprogrammed 110, and a set of sound transducers 112. The audio media source 102 includes a digital recording medium such as a compact disc (CD) that has been pre-recorded. The audio media source 102 may include PCM (Pulse Code Modulation) encoded audio signals recorded on the medium. Examples described here refer to CD's as the example used for the audio media source 102. However, the audio media source 102 may also include digital audio tape, or any other medium used for recording digital audio. The audio media reader 104 may be any device used to read digital audio signals from the audio media source 102. In examples described below, the audio media reader 104 is a CD player, but may also be any other suitable device configured to read digital audio signals on the selected recording medium.

The stream detector 106 receives digital signals from the audio media reader 104 and determines if the digital signals include a stream of formatted data containing code and/or data that is to be stored in the system's memory. If the digital signals include the stream of formatted data, the data is installed, or downloaded, in the memory of the device to be reprogrammed 110. The installation of the data into the device to be re-programmed 110 may involve "burning" or "programming" the device to be re-programmed 110 with the data written into appropriate locations in the memory of the device 110. The memory in the device to be re-programmed 110 may be Flash memory or any suitable programmable memory device such as, for example, programmable read-only (PROM), electrically programmable read-only (EPROM), and other similar types of memory devices. If the stream detector 106 does not detect the stream of formatted data in the digital signals, the digital signals are communicated to the audio receiver device 108. The audio receiver device 108 may include an audio amplifier or connection to an audio amplifier, which processes the output signals as audio and communicates the audio signals to the audio sound transducers 112.

The stream of formatted data that is downloaded to the device to be re-programmed 110 may include code representing updates or revisions to the software stored and operating in the system 100. The software may be stored and may operate under control of a processor (not shown) in, for example, the audio receiver device 108. The stream of formatted data may be previously programmed or recorded onto the audio media source 102 using a format such as the formats described below to create an update or revision CD. In an example implementation, the manufacturer of the system 100 may provide the programmed disk to customers that use the system 100. The system 100 may be used in a vehicle, and the system 100 may include the audio media reader 104 to generate audio entertainment for the user. The system 100 allows a user to upgrade or update software or other types of code or data that may be stored in a device to be re-programmed 110 operating in the vehicle.

It is to be understood that the block diagram in FIG. 1 describes a logical division of functions having physical (hardware and/or software) implementations that are not limited by architecture or the physical layout of the functions. The example system 100 shown in FIG. 1 may be implemented in a variety of configurations. For example, the stream detector 106, the audio receiving device 108, and the device to be re-programmed 110 may operate as hardware/software components in a single hardware and software unit, or in separate hardware/software units. For example, the stream detector 106, the audio receiving device 108, and the device to be re-programmed 110 may operate as components in an audio amplifier coupled to the audio media reader 104. An audio media reader 104 may also include all audio components used to output audio signals to the transducers 112 and may also include the stream detector 106, the audio receiving device 108, and the device to be re-programmed 110, or the stream detector 106 and the audio receiving device 108, but not the device to be re-programmed 110. Each hardware/software component (the stream detector 106, the audio receiving device 108, and the device to be re-programmed 110) may also be implemented as individual or combined printed circuit boards that operate in a system that includes all of the functions described with reference to FIG. 1.

Figure 2:
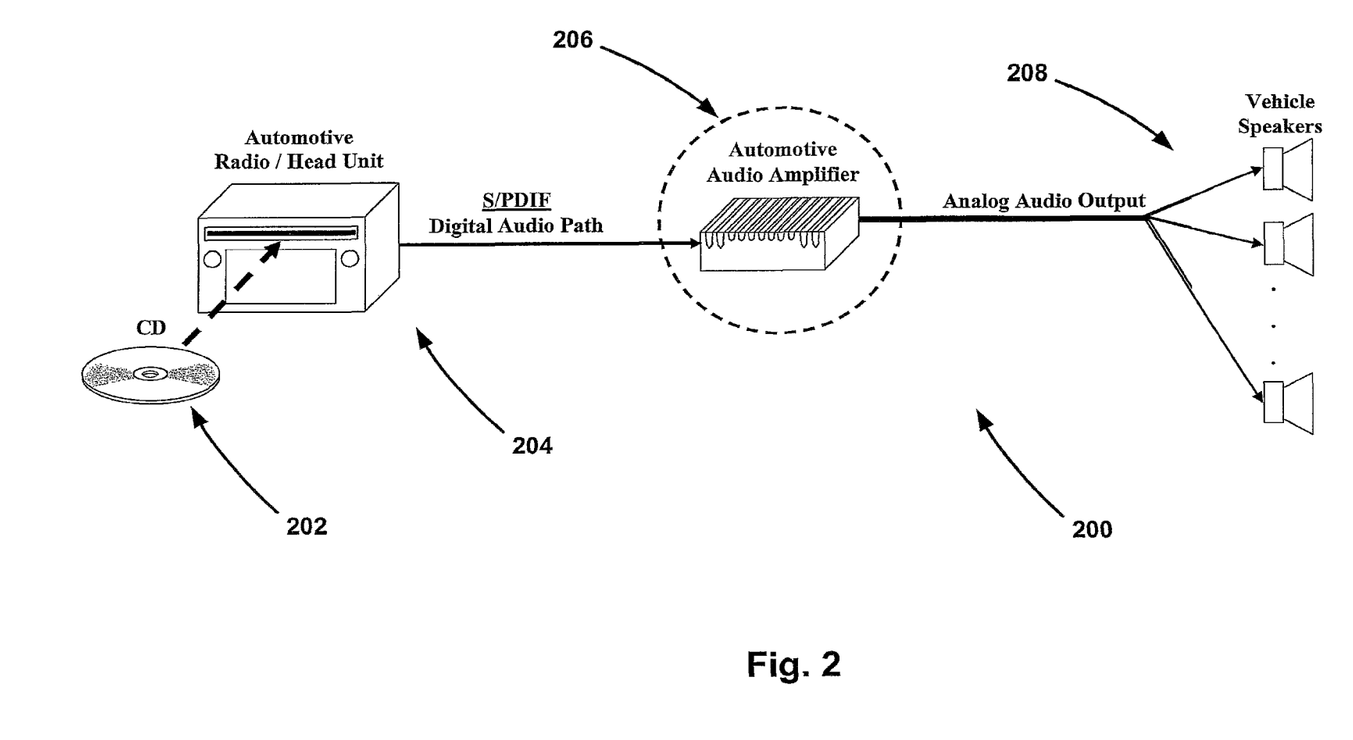
FIG. 2 is a schematic diagram illustrating operation of an example implementation of the system 200 of FIG. 1 in a vehicle.

FIG. 2 is a schematic diagram illustrating operation of an example implementation of the system 200 of FIG. 1 in a vehicle. The system 200 in FIG. 2 includes a CD 202, which may be inserted into an automotive radio/head unit 204. The digital data on the CD 202 may be coupled to an automotive audio amplifier 206 over a digital audio path. In the example shown in FIG. 2, the digital audio path is shown as conforming to the S/PDIF standard for audio signal communication. The audio amplifier 206 may include example implementations of the stream detector 106 (in FIG. 1) and the device to be re-programmed 110 (in FIG. 1). When the digital signal does not include formatted digital data, the digital audio signal is converted to an analog audio output signal and coupled to the vehicle's speakers 208.

In the system 200 shown in FIG. 2, the device to be re-programmed 110 (in FIG. 1) is a sub-system of the automotive audio amplifier 206. For example, the automotive audio amplifier 206 may include the stream detector 106 and process the digital signals containing audio signals. The stream detector 106 and device to be re-programmed 110 may be on any device that accepts a digital audio source such as a rear seat entertainment, satellite radio, or navigation system.

Figure 3:
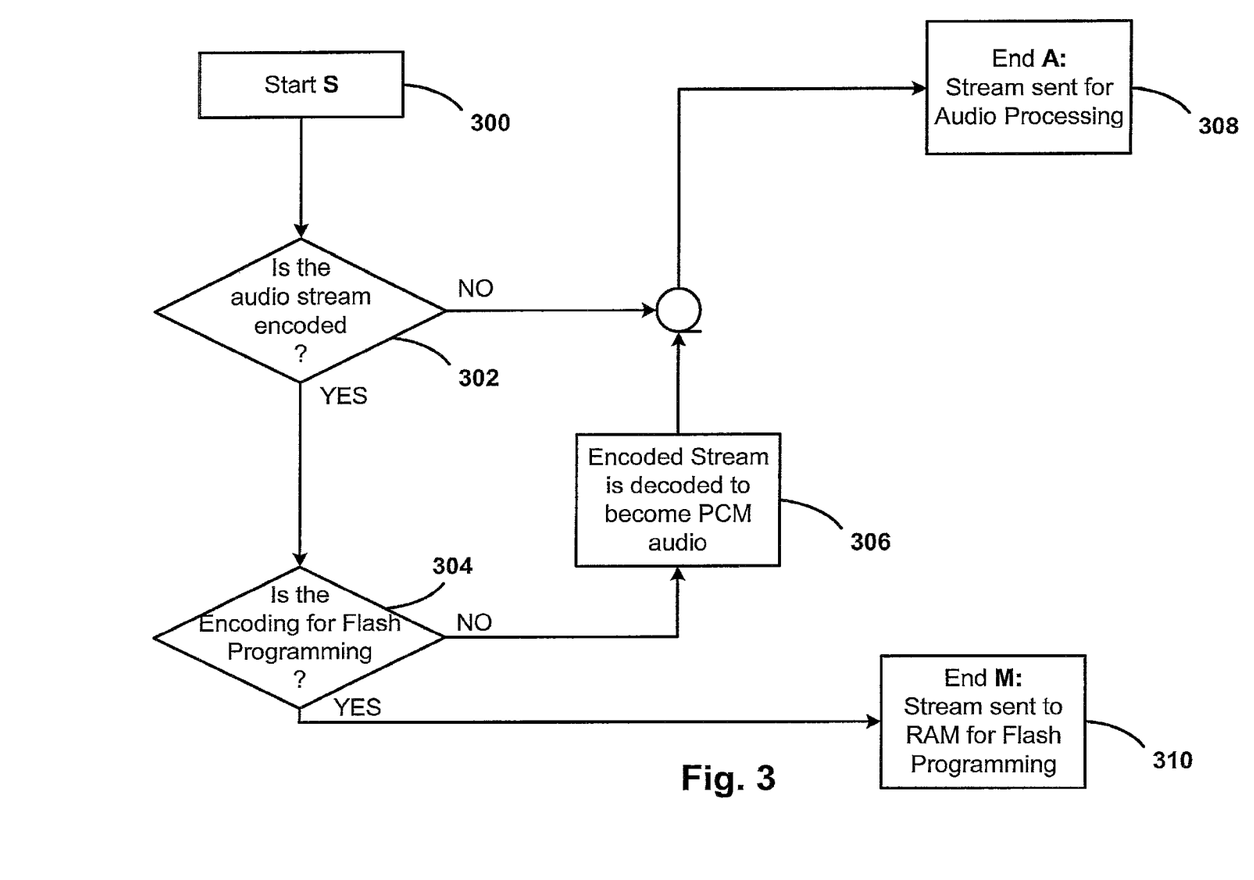
FIG. 3 is a flowchart illustrating operation of an example method for detecting a stream containing encoded data for re-programming a device.

FIG. 3 is a flowchart illustrating operation of an example method for detecting a stream for reprogramming device. The example method illustrated in FIG. 3 may be implemented by a stream detector 106 (FIG. 1), which may be a software and/or hardware function that receives the digital data from the audio media reader 104 (FIG. 1). When the digital data is received, the stream detection function 106 may be invoked at step 300 in FIG. 3. In one example, the received stream may be polled continuously for a software update identifier (an example of which is described below with reference to FIG. 6B). The software update identifier is specific to each device and may be any suitable pattern that matches the logic in decision block 304. For example, the pattern for the software update identifier may be any pattern that is not likely to occur in real audio. At decision block 302, the digital data is checked to determine if it contains non-PCM audio data. In an example implementation, the encoded data may include a header, or other similar portion of the digital data, that includes data values not likely to occur in real audio. If decision block 302 detects the data values as being encoded data, the digital data is further processed to determine if it is encoded for re-programming a device, which is the 'YES' path out of decision block 302. If the data is determined to be PCM audio, then the data is sent for audio processing, which is the 'NO' path out of decision block 302 to step 308. Digital data that is encoded audio data may include audio encoded for DD, DTS, or other similar encoding schemes, which is the "NO" path out of decision block 304.

At decision block 304, the digital data is further checked to determine if it is encoded for re-programming a device or if it is encoded audio data. For example, decision block 304 may involve further detecting data values in the header of the digital data stream. If decision block 304 determines that the digital data does not include a data stream encoded for device re-programming, the digital data is decoded to become a PCM audio stream at step 306 and further processed as audio at step 308. If decision block 304 determines that the digital data is encoded for device re-programming, the digital data stream is sent to the device for re-programming at step 310. This may involve storing in RAM memory prior to programming FLASH memory. An example of a method for re-programming the device is described below with reference to FIG. 8.

Figure 4:
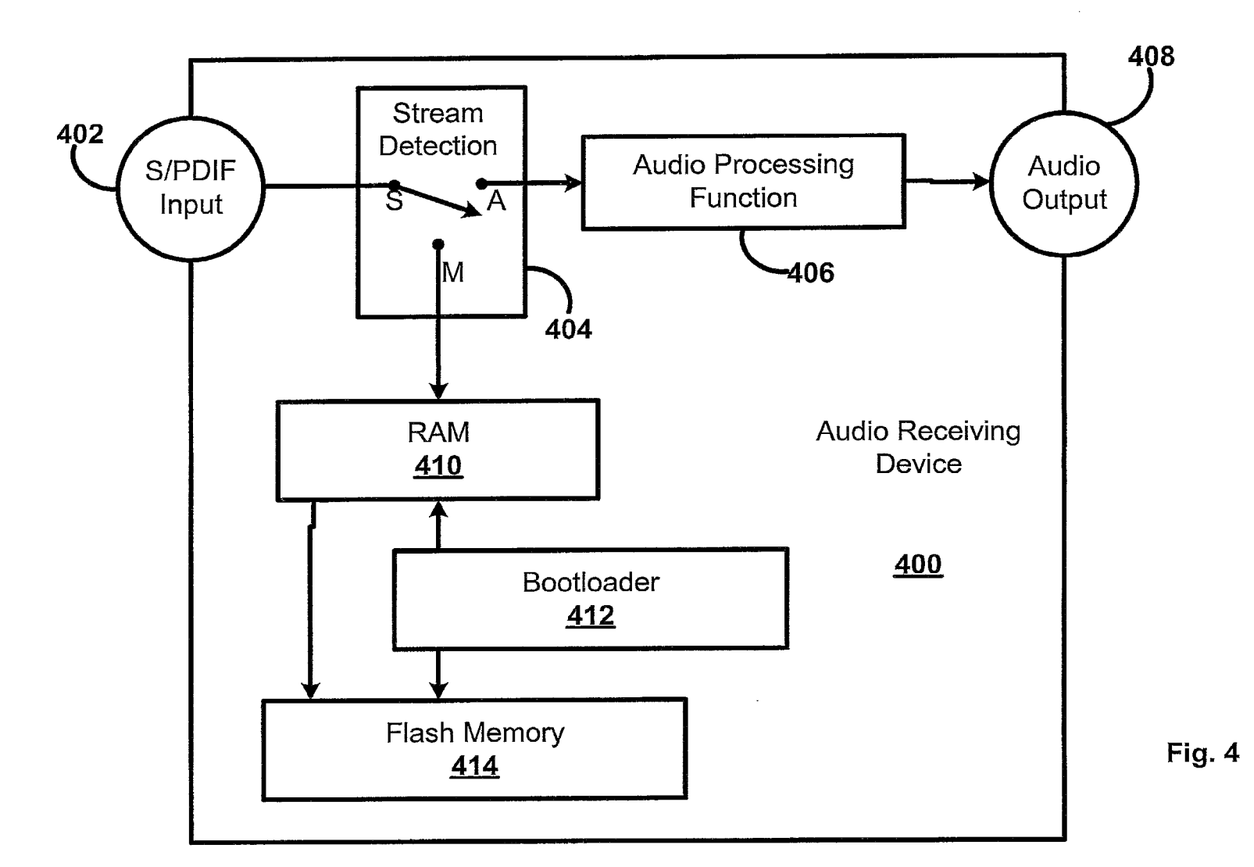
FIG. 4 is a block diagram of an example of an audio receiver device that implements a stream detector.

FIG. 4 is a block diagram of an example of an audio receiver device 400 that implements a stream detector 404. The receiver device 400 includes a digital data path input 402, which in the illustrated example is an S/PDIF input. The digital data is received at the digital data path input 402 and coupled to the stream detector 404 at a stream input S. If the stream detector 404 determines that the digital data includes encoded data for re-programming a device, the stream detector 404 switches the stream to the M output, which directs the data to a RAM memory device 410. If the stream detector 404 determines that the digital data includes digital audio signals, the stream detector 404 switches the stream to the A output, which directs the stream to an audio processing function 406 of the receiver device 400. The audio processing function 406 may include a processor for providing computer processing resources, and a digital-to-analog (D/A) converter function, which converts the digital data to analog signals. The analog signals are conditioned for output as audio at the audio output 408. The audio output 408 may be connected, for example, to a separate amplifier for further conditioning of the audio signals, or, if the audio receiver device 400 includes sufficient audio amplification capabilities, to sound transducers, such as vehicle speakers in an automobile.

The digital data stream that is stored in RAM 410 may be stored temporarily in RAM 410. A FLASH programming operation may be implemented by a bootloader function 412, which ensures that the data contained in the digital data stream is stored in the proper memory locations for operation as program code. The bootloader function 412 may, for example, re-calculate a checksum, which is used to ensure program code integrity.

Figure 5:
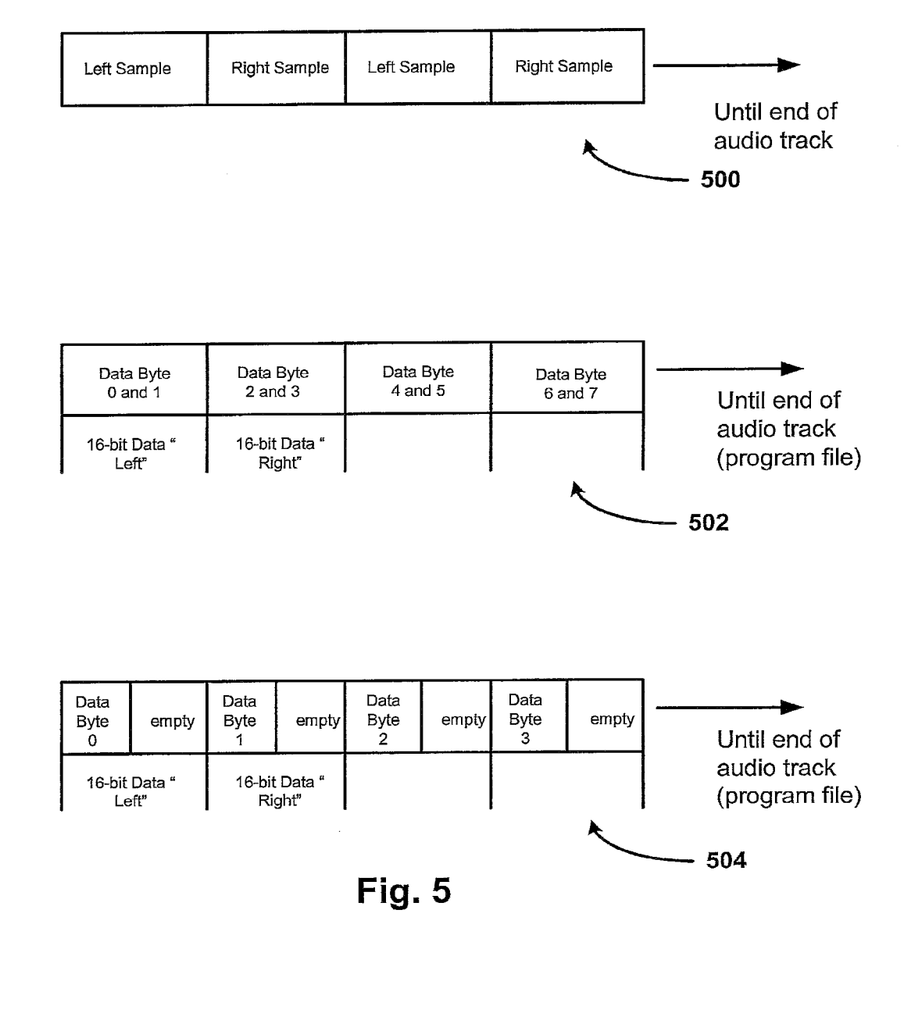
FIG. 5 illustrates examples of using a standard digital audio format to store encoded data for re-programming a device.

FIG. 5 illustrates examples of using a standard digital audio format to store data from a digital data stream into a digital recording medium. The formats in FIG. 5 include a standard PCM format 500, a first data encoded format 502 and a second encoded format 504.

The standard stereo PCM format 500 includes a stream of 16-bit pairs of PCM samples. For stereo audio material, there are pairs of "left" and "right" values for each recording. In the example of a compact disc (CD), the 16-bit samples provide 44,100 sets of audio data per second of recorded audio. An encoded digital data stream may use the same basic format to contain code or data instead of audio data.

The first encoded format 502 replaces the Left/Right channel data with a sequential set of data. The left channel data would be intended for storage in even address value locations, and the right channel data would be intended for storage in odd address value locations assuming that the addresses contain 16-bit data. If the addresses contain 8-bit data, the left channel data includes the first two bytes of a four-byte set ordered as data byte 0 and data byte 1. The right channel data includes the second two bytes of the four-byte set ordered as data byte 2 and data byte 3.

The second encoded format 504 each Left/Right pair of 16-bit values includes only one byte of data. The byte is left-justified in the 16-bit audio channel so that the most significant byte of each 16-bit channel includes a data byte, and the least significant byte of each 16-bit channel is empty. Maintaining an empty least significant byte may make the data download and software updates more robust. Data transferred from optical media such as CDs typically has an error rate of 1-bit every 100,000 bits, which may be enough to corrupt the entire software update. Bit errors are typically more prevalent in the lower significant bits. By placing the data in the 8 most-significant bits, the incidence of bit-errors is lowered.

Figure 6A:
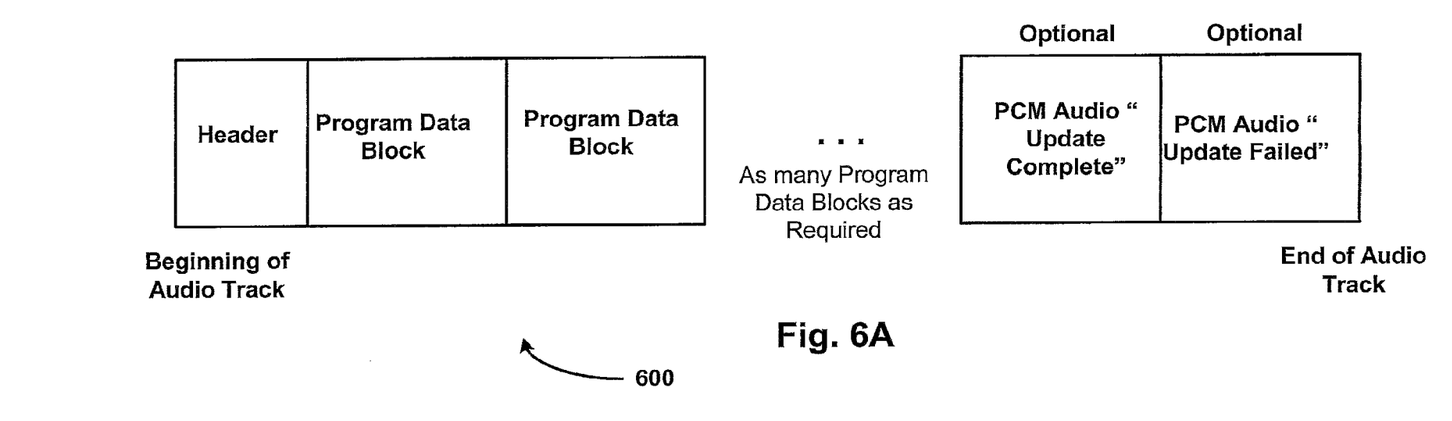
FIG. 6A illustrates an example audio track structure for storing encoded data on the digital recording medium.

FIG. 6A illustrates an audio track structure 600 for data in re-programming a device. The audio track structure 600 includes a Header, at least one program data block, and one or more optional audio messages as portions of the audio track 600 labeled accordingly in FIG. 6A. The Header includes information about the encoded data. For example, the Header may include information that enables identifying the data as encoded data for re-programming the device, information about the structure of the data, information about the size of the data, and update feedback flags that provides information as to the use of messages indicating success or failure of a software update. The at least one program data block includes the data that is to be programmed into the device to be re-programmed. The optional audio messages include audio messages, which are played at the conclusion of a software update to indicate the success or failure of the update.

Figure 6B:
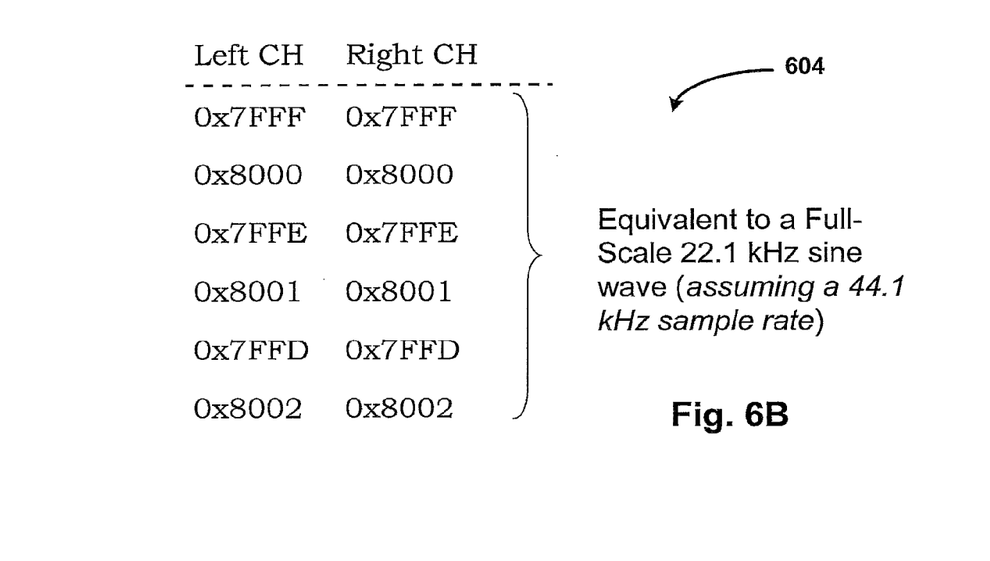
FIG. 6B illustrates an example header from the structure shown in FIG. 6A.
Figure 7:
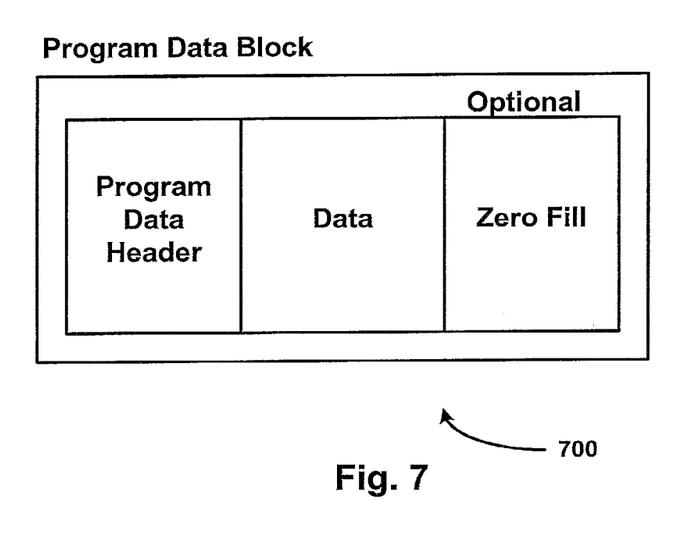
FIG. 7 illustrates an example program data block that may be used in the audio track structure in FIG. 6B.

Each portion may be formatted in a manner that enables the stream detector 110 (in FIG. 1) to determine whether to process the data as audio or encoded data, and that enables the bootloader function 412 (in FIG. 4) to properly program the device to be re-programmed. The program data blocks may include duplicates to enable receipt of one or more duplicate program data blocks in the event that a program data block is corrupted. FIGS. 6B and 7 illustrate examples of the types of data that may be included in a header and a program data block that may be used in the audio track structure 600 in FIG. 6A.

The Header of the audio track structure 600 may include a Software Update Identifier block, a Program Data Block Unique Count, a Program Data Block Size, a Data Block Duplication Count, an "Update Complete" message, and an "Update Failed" message.

FIG. 6B illustrates an example software update identifier 604 in the structure shown in FIG. 6A. The Software Update Identifier 604 in FIG. 6B includes left channel data and right channel data in accordance with the stereo PCM audio format. The Software Update Identifier 604 in FIG. 6B is illustrated as conforming to the first encoded data format 502 described above with reference to FIG. 5. The data contained in the Software Update Identifier 604 in FIG. 6B may represent a pattern or set of data values not typically encountered in audio data. In the example shown in FIG. 6B, the data values are equivalent to a full-scale 22.1 kHz sine wave (assuming a 44.1 kHz sample rate). Any suitable pattern or set of values may be used.

The Header in the audio track structure 600 in FIG. 6A may also include a Program Data Block Unique Count, which is the number of program data blocks in the track. Duplicate program data blocks are not included in the count.

The Program Data Block Size includes the number of bytes, or words, in each program data block.

The Data Block Duplication Count includes the number of repeated program data blocks. For example, a count of 2 indicates that there are two copies of the same block, one right after another. Having duplicate blocks increases the robustness of software update in the event of corrupted data segments. Examples of data corruption may include scratches on optical medial or defective FLASH memory.

The "Update Complete" Message is optional. In one example, a Boolean value (True/False) is used in the Header to indicate whether an "Update Complete" message block is present.

The "Update Failed" Message is optional. In one example, a Boolean value (True/False) is used in the Header to indicate whether an "Update Failed" message block is present.

FIG. 7 illustrates an example program data block 700 that may be used in the audio track structure in FIG. 6A. The program data block 700 may be divided into three sections: Program Data Header, Data, and Zero Fill. The Program Data Header may include the following parameters:

1. Program Data Block Identifier: An identifier, such as for example, 0xA700, or another unique value that may be used to identify the data portion as a Program Data Block.
2. Starting Target Address: An address value for the starting address of the block of data. The address value may be relative to the memory space of the target system of the device to be re-programmed.
3. Size of Addresses: Size of a data element addressed in the system in bytes. For example, the following scheme may be used: 1 for 8-bit, 2 for 16-bit, and 4 for 32-bit sizes.
4. Length of Data segment: number of bytes, or words, in the data segment to be downloaded to the device.
5. Length of Zero Fill: Number bytes, or words, in zero fill segments.
6. Unique Block Number: Used to ensure integrity. The unique block number should be the same across all duplicated versions of the block.
7. Checksum of Data Block: CRC or equivalent checksum calculation of the data block segment. The checksum size may be 32-bits.

The data segment of the program data block 700 may include the program code in sequential order. In the examples described here, the data segment is assumed to conform to the second encoded format 504 in FIG. 5.

The Zero Fill segment may include any data value that is ignored. The time period during which the zero fill data is being received may be used to process the data that is to be copied into RAM.

Referring back to the audio track structure 600 in FIG. 6A, the "Update Complete" message may include a PCM audio file that outputs a spoken word audio message of "Update Complete." The "Update Complete" message provides feedback indicating success of the download. The message may be played if the device being updated includes access to speakers. For example, the device being updated in the example shown in FIG. 4 is the audio receiver device 400, which connects to the audio output to the speakers. The "Update Complete" message may be output when it is determined that the software update is successfully completed. The "Update Complete" message may not be used if the device being updated does not have access to the audio output, or lacks a way of informing another device with access to the audio output that the software update was successfully completed.

The "Update Failed" message may include a PCM audio file that outputs a spoken word audio message of "Update Failed." The "Update Failed" message provides feedback indicating failure of the download. Examples of situations in which the "Update Failed" message may be played include:

1. Checksum mismatch of a unique Program Data Block and all of its duplicates.
2. Program data identifier not found in a unique Program Data Block and all of its duplicates.
3. Incorrect program data block count.
4. Timeout error due to audio track being cut short.
5. Internal Flash or RAM memory error.

Figure 8:
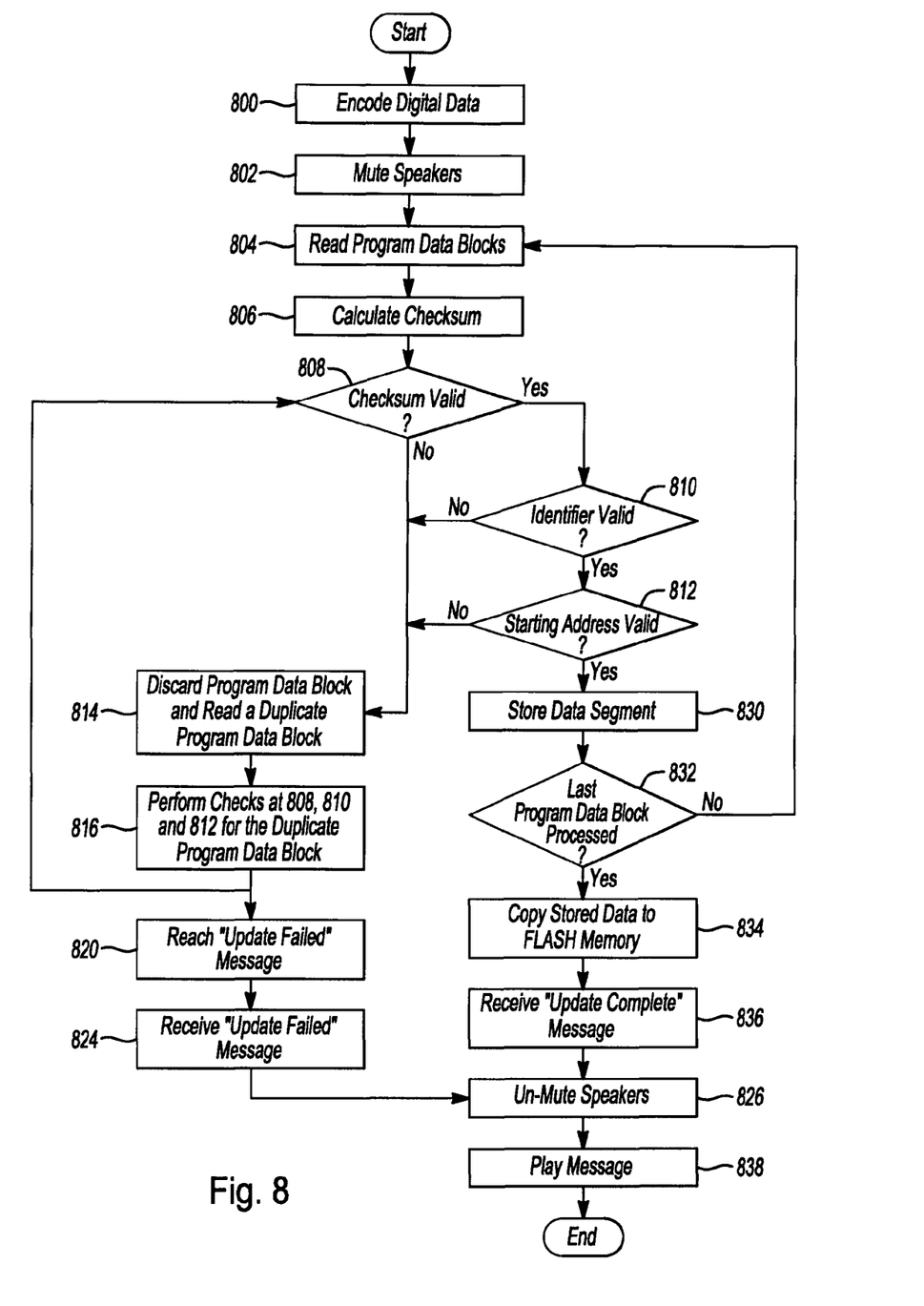
FIG. 8 is a flowchart illustrating an example method for processing an audio track containing encoded data for re-programming a device.

FIG. 8 is a flowchart illustrating an example method for processing an audio track containing encoded data for re-programming a device. In one example, the method illustrated in FIG. 8 may be implemented to perform the functions performed at step 310 in FIG. 3. FIG. 8 shows how the information in the header and program data blocks may be used to process the data.

At step 800, the digital data has been determined to be encoded data for re-programming a device. The contents of the Header, which may include information described above with reference to FIGS. 6A and 6B. The information may include the program data block count, duplicate counts, checksum in the header, and other information that may be used in reading in the program data blocks. At step 802, the speakers are muted during the re-programming process. At step 804, program data blocks are read in one at a time. For each program data block a set of validation checks are performed. For example, at step 806, the program data block checksum is calculated. At decision block 808, the calculated checksum is compared to the header checksum that was retrieved from the header in step 800. If the checksum is valid, the program data block identifier is checked at decision block 810. If the program data block identifier is valid, the starting address is checked to determine if it is for valid memory addresses at decision block 812. If any of the checksum, program data block identifier and starting address checks fail, the program data block is discarded and a duplicate is read in at step 814. At step 816, the checks performed in decision blocks 808, 810, and 812 are performed for the duplicate program data blocks. As each duplicate is read in, the tests are performed until all of the duplicate program data blocks have been read in, or until one duplicate program data block passes all of the checks. The number of duplicates for each program data block is known from the header information stored at step 800.

If a duplicate program data block passes, the next program data block is read in at step 804. If all of the duplicates fail, the process is aborted and all of the program data blocks remaining in the audio track are read in until the "Update Failed" message header is reached at step 820. At step 824, the "Update Failed" message is retrieved. At step 826, the speakers are un-muted. At step 838, the retrieved "Update Failed" message is played out the speakers.

At decision block 812, if a program data block passes all of the checks, the data segment in the program data block is read and stored in RAM at step 830. At decision block 832, the program data block count is checked to determine if the last program data block has been processed. IF not, the next program data block is read in at step 804. If the last program data block has been read in, it is at this point, stored in RAM such as the RAM 410 in FIG. 4. At step 834, the data stored in RAM may then be copied to FLASH memory 414 (in FIG. 4) to re-program the device. If no copy errors are encountered, the "Update Completed" message is retrieved at step 836. The speakers are un-muted at step 826 and the retrieved "Update Completed" message is played out of the speakers at step 838.

As described with reference to FIGS. 1-8, a system and methods are provided to re-program a device in a system having audio capabilities using an audio media source read by an audio playback system. It will be understood, and is appreciated by persons skilled in the art, that one or more processes, sub-processes, or process steps described in connection with FIGS. 3 and 4 may be performed by a combination of hardware and software. The software may reside in software memory internal or external to a processing unit, or other controller, in a suitable electronic processing component or system such as one or more of the functional components or modules depicted in FIGS. 1, 2 and 4. The software in memory may include an ordered listing of executable instructions for implementing logical functions (that is, "logic" that may be implemented either in digital form such as digital circuitry or source code), and may selectively be embodied in any tangible computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store, communicate, or transport the program for use by or in connection with the instruction execution system, apparatus, or device. The computer readable medium may selectively be, for example, but is not limited to, an electronic, magnetic, optical, electromagnetic, infrared, or semiconductor system, apparatus, device, or medium. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic), and a portable compact disc read-only memory "CDROM" (optical) or similar discs (e.g., DVDs and Rewritable CDs). Note that the computer-readable medium may even be paper or another suitable medium upon which the program is printed, as the program can be electronically captured, via, for instance, optical scanning or reading of the paper or other medium, then compiled, interpreted or otherwise processed in a suitable manner if necessary, and then stored in the memory.

The foregoing description of an implementation has been presented for purposes of illustration and description. It is not exhaustive and does not limit the claimed inventions to the precise form disclosed. Modifications and variations are possible in light of the above description or may be acquired from practicing the invention. Note also that the implementation may vary between systems. The claims and their equivalents define the scope of the invention.

What is claimed:

1. A system comprising:
   a stream detector configured to receive a digital data stream comprising audio data or encoded data, the stream detector further configured to detect whether the encoded data is formatted as audio data or is formatted as re-programming data;
   an audio receiver device configured to receive the audio data and the encoded data formatted as audio data for playback; and
   a device configured to receive the re-programming data, the re-programming data configured to re-program the device based on the re-programming data.

2. The system of claim 1 where the device to be re-programmed includes electrically programmable memory configured to be programmed to store the re-programming data that includes executable program code.

3. The system of claim 2 where the electrically programmable memory is either a FLASH memory device, an electrically erasable programmable read-only memory (EEPROM), an erasable programmable read-only memory (EPROM), a Non-Volatile RAM (NOVRAM), or a non-volatile magnetic storage medium.

4. The system of claim 1 further comprising at least one RAM memory device for temporarily storing the re-programming data before storing the re-programming data in the device to be re-programmed.

5. The system of claim 1 further comprising an audio media source, where the audio media source contains recorded digital data that includes program code intended for storage in the device to be re-programmed and for execution by a processor that operates using the device to be re-programmed.

6. The system of claim 5 where the digital data recorded on the audio media source includes a header containing information about the re-programming data.

7. The system of claim 6 where the header includes a software update identifier indicative of re-programming data to be programmed into the device to be re-programmed.

8. The system of claim 7 where the software update identifier includes a set of data forming a pattern of audio not typically in an audio signal.

9. The system of claim 7 where the header includes any of the following information: information relating to the structure of the encoded data; information relating to the size of the encoded data; or information relating to update success or failure messages.

10. The system of claim 5 where the encoded data recorded on the audio media source is formatted in a structure that conforms to a standard PCM format.

11. The system of claim 10 where the encoded data conforms to a first encoded format in which data is sequentially stored according to a Left/Right channel data format having an 8-bit left channel and an 8-bit right channel such that data to be stored in even address locations align with the left channel and data to be stored in odd address locations align with the right channel.

12. The system of claim 10 where the encoded data conforms to a second encoded format in which data is sequentially stored according to a Left/Right channel data format having a most-significant byte in a left channel and a least significant byte in a right channel such that each byte of the data is stored in the left channel and a null is stored in each right channel.

13. The system of claim 10 where the encoded data is structured as program data blocks, each program data block having a program data block header, a data block and a zero fill.

14. The system of claim 13 where the program data block header includes any of the following information: Program Data Block Identifier; Starting Target Address; Size of Addresses; Length of Data segment; Length of Zero Fill; Unique Block Number; or Checksum.

15. The system of claim 13 where the program data includes at least one duplicate data block.

16. The system of claim 1 where the stream detector is implemented as components controlled by a processor operating in the audio receiver device.

17. The system of claim 1 further comprising an audio media reader, where the audio media reader is implemented in a digital disc player unit.

18. The system of claim 17 where the audio media reader and the audio receiver device are components operating in an automobile audio playback system.

19. A method comprising:
   reading a digital data stream from an audio media source;
   determining if digital data in the digital data stream includes encoded data;

determining if the encoded data is formatted as audio data or formatted as update code;

processing the digital data as audio data if the digital data does not include encoded data;

processing the digital data as audio data if the digital data includes encoded data formatted as audio data; and sending the digital data formatted as update code to a device to be re-programmed.

20. The method of claim 19 where the step of determining if the digital data includes encoded data comprises:

detecting a header in the digital data stream; and detecting a software update identifier in the header.

21. The method of claim 19 where the step of sending the digital data to the device to be re-programmed includes:

processing the digital data as program blocks; and storing the blocks of data in RAM before transferring the digital data to the device to be re-programmed.

22. The method of claim 21 where the step of processing the digital data includes:

storing an integrity check parameter contained in the encoded data for each program block;

reading the digital data included in the program data block;

calculating a download integrity check parameter; and comparing the integrity check parameter and the download integrity check parameter.

23. The method of claim 22 where:

the integrity check parameter is a checksum contained in the encoded data, and the download integrity check parameter is a calculated checksum; or the integrity check parameter is a program data block count contained in the encoded data, and the download integrity check parameter is a calculated program data block count.

24. The method of claim 22 where the encoded data includes program blocks and duplicate program blocks, the method step of processing the digital data including:

after the step of comparing the integrity check parameter with the download integrity check parameter, if the integrity check parameter is not equal to the download integrity check parameter, reading the digital data included in the duplicate program data block;

calculating a download integrity check parameter for each duplicate program block; comparing the integrity check parameter and the download integrity check parameter; and repeating the steps of reading digital data included in the duplicate program data blocks until either the integrity check parameter is equal to the download integrity check parameter or until there are no more duplicate program data blocks.

25. The method of claim 24 where:

the integrity check parameter is a checksum contained in the encoded data, and the download integrity check parameter is a calculated checksum; or the integrity check parameter is a program data block count contained in the encoded data, and the download integrity check parameter is a calculated program data block count.

26. The method of claim 19 further comprising: generating an audible message indicative of the success or failure of the software update.

27. A digital recording medium for storing digital data in a digital audio format, the digital recording medium comprising:

a disc form compatible with an audio digital reader for reading the digital data stored on the digital recording medium and sending the digital data to a stream detector that determines whether to process the digital data as audio data or encoded data;

recorded tracks containing the encoded data, the encoded data including program code in a first format intended for storage in the device to be re-programmed and for execution by a processor that operates using the device to be re-programmed and the encoded data further including music data in a second format, the music data in the second format processed as audio data by the stream detector.

28. The digital recording medium of claim 27 where the digital data recorded on the audio media source includes a header containing information about the encoded data.

29. The digital recording medium of claim 28 where the header includes a software update identifier indicative of encoded data to be programmed into the device to be re-programmed.

30. The digital recording medium of claim 29 where the software update identifier includes a set of data forming a pattern of audio not typically in an audio signal.

31. The digital recording medium of claim 29 where the header includes:

information relating to the structure of the encoded data;

information relating to the size of the encoded data; or information relating to update success or failure messages.

32. The digital recording medium of claim 27 where the encoded data recorded on the audio media source is formatted in a structure that conforms to a standard PCM format.

33. The digital recording medium of claim 32 where the encoded data conforms to a first encoded format in which data is sequentially stored according to a Left/Right channel data format having a multi-bit left channel and a multi-bit right channel such that data to be stored in even address locations align with the left channel and data to be stored in odd address locations align with the right channel.

34. The digital recording medium of claim 32 where the encoded data conforms to a second encoded format in which data is sequentially stored according to a Left/Right channel data format having a most-significant byte in a left channel and a least significant byte in a right channel such that each byte of the data is stored in the left channel and a null is stored in each right channel.

35. The digital recording medium of claim 32 where the encoded data is structured as program data blocks, each program data block having a program data block header, a data block and a zero fill.

36. The digital recording medium of claim 35 where the program data block header includes: Program Data Block Identifier; Starting Target Address; Size of Addresses; Length of Data segment; Length of Zero Fill; Unique Block Number; or Checksum.

37. The digital recording medium of claim 35 where the program data includes at least one duplicate data block.

38. An audio receiver device comprising:

a digital data input connection to an audio media reader; a device to be reprogrammed configured to store program code used by an audio data processor, the device configurable to be electrically programmed and re-programmed;

an audio data processor coupled to an audio output, the audio data processor configured to convert audio data to analog audio signals; and a stream detector configured to receive a digital data stream from the audio media reader and detect encoded data and audio data in the digital data stream, the stream detector further configured to detect encoded data formatted as audio data and encoded data formatted as executable program code, and the stream detector also configured to direct audio data and the encoded data formatted as audio data to the audio data processor and direct the encoded data formatted as executable program code to the device for storing program code.

39. The audio receiver device of claim 38 where the device to be re-programmed includes electrically programmable memory configured to be programmed to store the encoded data formatted as executable program code.

40. The audio receiver device of claim 39 where the electrically programmable memory is either a FLASH memory device, an electrically erasable programmable read-only memory (EEPROM), an erasable programmable read-only memory (EPROM), a Non-Volatile RAM (NOVRAM), or a non-volatile magnetic storage medium.

41. The audio receiver device of claim 38 further comprising at least one RAM memory device for temporarily storing the encoded data before storing the encoded data in the device to be re-programmed.

42. The audio receiver device of claim 38 where the stream detector includes program code comprising:
   logic configured to detect a header in the digital data stream; and
   logic configured to detect a software update identifier in the header.

43. The audio receiver device of claim 38 includes program code comprising:
   logic configured to process the digital data stream as program blocks;
   logic configured to store the blocks of data in RAM before transferring the digital data stream to the device to be re-programmed.

44. The audio receiver device of claim 43 where the logic configured to process the digital data stream includes:
   logic configured to store an integrity check parameter contained in the encoded data for each program block;
   logic configured to read the digital data stream included in the program data block;
   logic configured to calculate a download integrity check parameter; and
   logic configured to compare the integrity check parameter and the download integrity check parameter.

45. The audio receiver device of claim 44 where: the integrity check parameter is a checksum contained in the encoded data, and the download integrity check parameter is a calculated checksum; or
   the integrity check parameter is a program data block count contained in the encoded data, and the download integrity check parameter is a calculated program data block count.

46. The audio receiver device of claim 44 where the encoded data includes program blocks and duplicate program blocks, the logic configured to process digital data included in the digital data stream including:
   logic configured to read the digital data included in the duplicate program data block if, after the comparing the integrity check parameter with the download integrity check parameter, the integrity check parameter is not equal to the download integrity check parameter;
   logic configured to calculate a download integrity check parameter for each duplicate program block;
   logic configured to compare the integrity check parameter and the download integrity check parameter; and
   logic configured to repeat the reading digital data included in the duplicate program data blocks until either the integrity check parameter is equal to the download integrity check parameter or until there are no more duplicate program data blocks.

47. The audio receiver device of claim 46 where: the integrity check parameter is a checksum contained in the encoded data, and the download integrity check parameter is a calculated checksum; or
   the integrity check parameter is a program data block count contained in the encoded data, and the download integrity check parameter is a calculated program data block count.

48. The audio receiver device of claim 38 further comprising: logic configured to generate an audible message indicative of success or failure of a software update included in the encoded data formatted as executable program code.

* * * * *